United States Patent
Hinkle

(10) Patent No.: US 11,809,272 B2
(45) Date of Patent: Nov. 7, 2023

(54) ERROR CORRECTION CODE OFFLOAD FOR A SERIALLY-ATTACHED MEMORY DEVICE

(71) Applicant: Lenovo Global Technology (United States) Inc., Morrisville, NC (US)

(72) Inventor: Jonathan Hinkle, Raleigh, NC (US)

(*) Notice: Subject to any disclaimer, the term of this patent is extended or adjusted under 35 U.S.C. 154(b) by 77 days.

(21) Appl. No.: 17/696,937

(22) Filed: Mar. 17, 2022

(65) Prior Publication Data

US 2023/0297244 A1 Sep. 21, 2023

(51) Int. Cl.
*G06F 12/00* (2006.01)
*G06F 11/10* (2006.01)
*G06F 3/06* (2006.01)

(52) U.S. Cl.
CPC .......... *G06F 11/10* (2013.01); *G06F 3/0619* (2013.01); *G06F 3/0655* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 2018/0248650 A1* | 8/2018 | Das Sharma | H04L 1/007 |
| 2019/0278721 A1* | 9/2019 | Agarwal | G06F 12/0835 |
| 2021/0049068 A1* | 2/2021 | Schaefer | H03M 13/05 |
| 2022/0149866 A1* | 5/2022 | Alzheimer | H03M 13/015 |

* cited by examiner

*Primary Examiner* — Daniel D Tsui
(74) *Attorney, Agent, or Firm* — Jeffrey L. Streets

(57) ABSTRACT

A computer-implemented method and a serially-attached memory device for performing the method are provided. The method includes a memory device controller receiving data over an error-protected serial link from a host processor, wherein the memory device controller is included in a serially-attached memory device along with memory media coupled to the memory device controller. The method further includes the memory device controller storing the received data in the memory media coupled to the memory device controller, the memory device controller calculating error correction code for the received data, and the memory device controller storing the error correction code in the memory media coupled to the memory device controller.

15 Claims, 4 Drawing Sheets

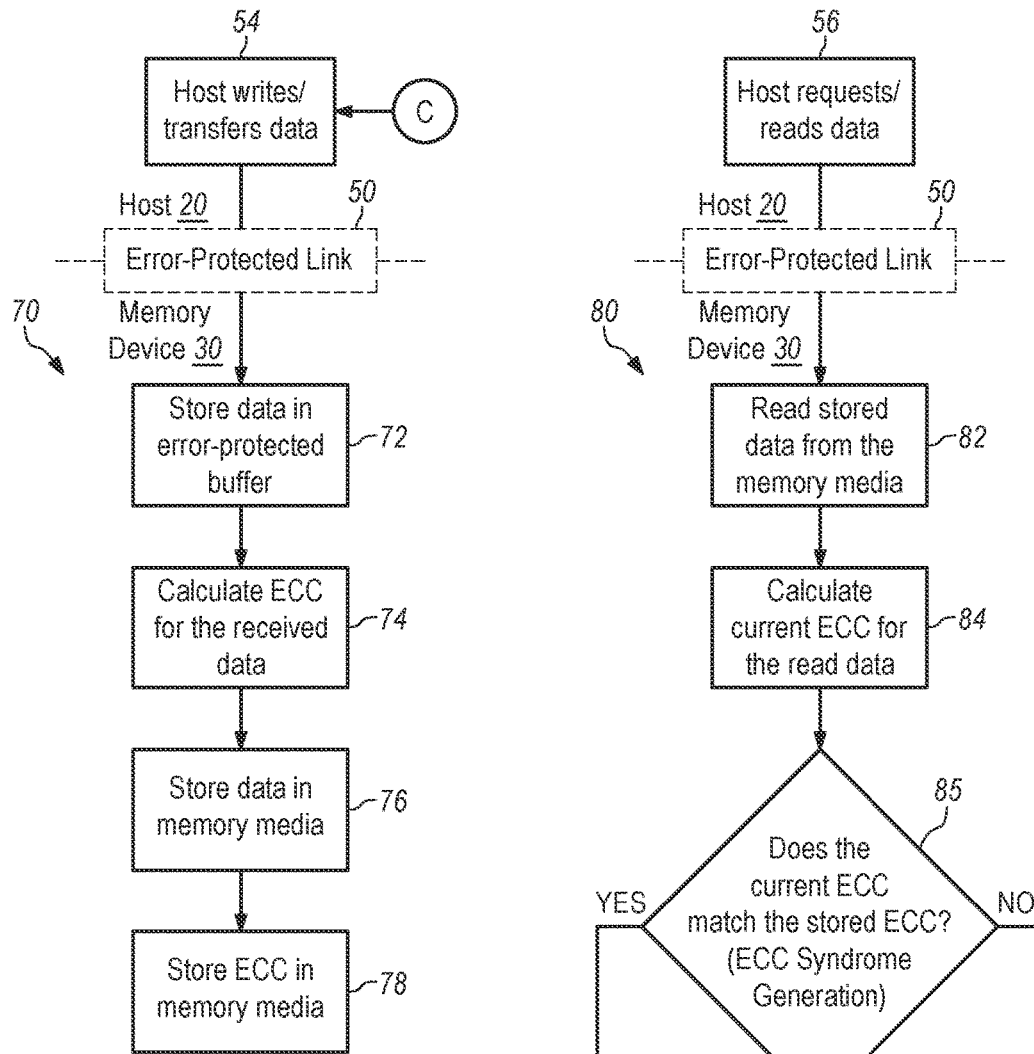
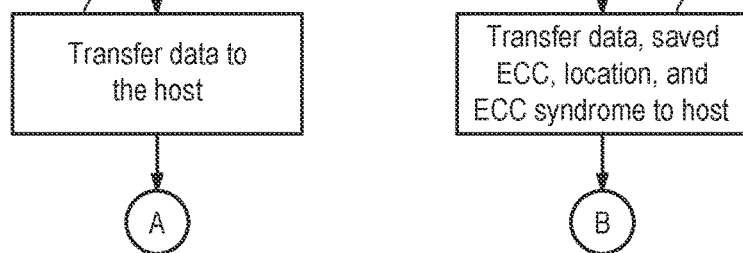

ERROR CORRECTION CODE OFFLOAD FOR A SERIALLY-ATTACHED MEMORY DEVICE

BACKGROUND

The present disclosure relates to the use of error correction codes to protect data being stored in a serially-attached memory device.

BACKGROUND OF THE RELATED ART

Current memory interfaces and error correction methods write to one to two chips that are dedicated to error-correction code (ECC) over a dedicated interconnect. By sending the ECC data over a dedicated interconnect, the ECC data does not compete for bandwidth with the data (message) being stored in memory. Storing ECC data in association with memory writes helps ensure that any errors later incurred within the internal memory array will be detected and potentially corrected.

In current implementations of double data rate (DDR) memory, the ECC protects both the link transmission of data to and from DDR memory. If a bit flips on transmission of data over traces and/or wires in a memory write, then the data is stored in DRAM with the error. It is not until the data is read back by the system that the error in the data is detected and corrected by the host. If a bit flips in transmission of the data on a read, then the transmission error is similarly detected and corrected by the host. ECC also protects bit errors in memory that occur in the DRAM chip itself. For example, if a capacitive memory cell loses too much of its charge for any reason or it otherwise experiences an induced error, then such errors in memory are also detected and corrected using the ECC when the host system reads that data. Thus, with traditional DDR-attached DRAM, the error protection is end-to-end from host through the memory device, covering both potential interface errors and memory die errors.

However, a serially-attached memory device does not have a separate dedicated interconnect for receiving error-correction code. Accordingly, implementing similar end-to-end error protection with a serially-attached memory device requires transmission of data and error-correction code from the host to the serially-attached memory device over the same interconnect.

BRIEF SUMMARY

Some embodiments provide a computer program product comprising a non-transitory computer readable medium and program instructions embodied therein, the program instructions being configured to be executable by a processor to cause the processor to perform various operations. The operations may comprise: receiving data over an error-protected serial link from a host processor, wherein the data is received by a memory device controller included in a serially-attached memory device that further includes memory media coupled to the memory device controller; calculating error correction code for the received data; storing the received data at a particular memory address in the memory media coupled to the memory device controller; and storing the error correction code in the memory media coupled to the memory device controller, wherein the error correction code is stored in association with the particular memory address of the received data. The operations may further comprise: receiving a request from the host processor requesting to read the data stored on the memory media at the particular memory address and transfer the read data to the host processor; reading the requested data stored at the particular memory address and calculating a current error-correction code for the read data; reading the error-correction code stored in association with the particular memory address of the requested data and determining whether the current error-correction code matches the stored error-correction code; and transferring the requested data to the host processor over the error-protected serial link without the current or stored error correction code in response to determining that the current error-correction code matches the stored error-correction code.

Some embodiments provide a computer program product comprising a non-transitory computer readable medium and program instructions embodied therein, the program instructions being configured to be executable by a processor to cause the processor to perform operations comprising: sending a request for data stored on memory media of a serially-attached memory device at a particular memory address, wherein the request is sent to the memory device over an error-protected serial link; receiving, from the memory device over the error-protected link, the requested data, error correction code data stored on the memory media in association with the requested data, the particular memory address of the requested data, and error correction code syndrome data describing an error that the memory device determined to be contained in the requested data; calculating error-correction code syndrome data for the received data and error correction code data using an error-correction code algorithm; and determining whether the calculated error-correction code syndrome data matches the error-correction code syndrome data received from the memory device.

Some embodiments provide a computer-implemented method comprising: a memory device controller receiving data over an error-protected serial link from a host processor, wherein the memory device controller is included in a serial-attached memory device along with memory media coupled to the memory device controller; the memory device controller storing the received data in the memory media coupled to the memory device controller at a particular memory address; the memory device controller calculating error correction code for the received data; and the memory device controller storing the error correction code in the memory media coupled to the memory device controller in association with the particular memory address. The computer-implemented method may further comprise: the memory device controller receiving a request from the host processor requesting to read the data stored on the memory media and transfer the read data to the host processor; the memory device controller reading the stored data and calculating a current error-correction code for the read data; the memory device controller reading the stored error-correction code and determining whether the current error-correction code matches the stored error-correction code; and the memory device controller transferring the read data to the host processor over the error-protected serial link in response to determining that the current error-correction code matches the stored error-correction code.

Some embodiments provide a serially-attached memory device comprising: a printed circuit board; memory chips mounted on the printed circuit board; a memory device controller mounted on the printed board and coupled to the memory chips; and an interface for connecting the memory device controller to a host processor over an error protected link, wherein the memory device controller is configured to perform various operations. The operations may comprise:

receiving data over the error-protected serial link from the host processor; calculating error correction code for the received data; storing the received data at a particular memory address in the memory media coupled to the memory device controller; storing the error correction code in the memory media coupled to the memory device controller, wherein the error correction code is stored in association with the particular memory address of the received data; receiving a request from the host processor requesting to read the data stored on the memory media at the particular memory address and transfer the read data to the host processor; reading the data stored at the particular memory address and calculating a current error-correction code for the read data; reading the error-correction code stored in association with the particular memory address of the requested data and determining whether the current error-correction code matches the stored error-correction code; and transferring the read data to the host processor over the error-protected serial link without the current or stored error correction code in response to determining that the current error-correction code matches the stored error-correction code.

BRIEF DESCRIPTION OF THE SEVERAL VIEWS OF THE DRAWINGS

FIG. 3A is a flowchart for a method of the serially-attached memory device responding to a write request received from the host processor over the error-protected link.

FIG. 3B is a flowchart for a method of the serially-attached memory device responding to a read request received from the host processor over the error-protected link.

DETAILED DESCRIPTION

Figure 1:
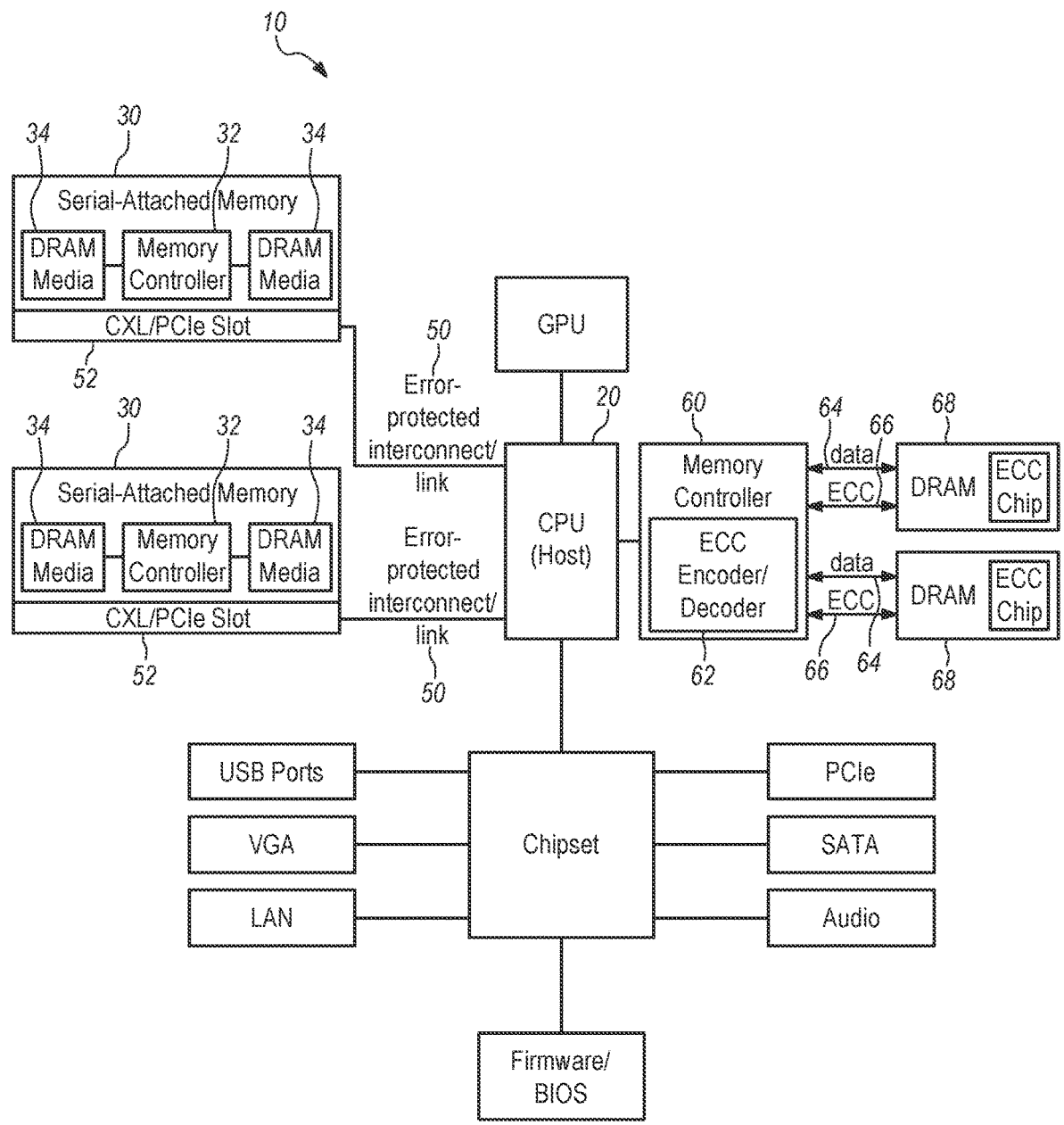
FIG. 1 is a diagram of a computing system that includes a host processor coupled to a serially-attached memory device over an error-protected link.

Some embodiments provide a computer-implemented method comprising a memory device controller receiving data over an error-protected serial link from a host processor, wherein the memory device controller is included in a serially-attached memory device along with memory media coupled to the memory device controller. The method further comprises the memory device controller storing the received data in the memory media coupled to the memory device controller, the memory device controller calculating error correction code for the received data, and the memory device controller storing the error correction code in the memory media coupled to the memory device controller.

In some embodiments, the error-protected serial link may be implemented using an interface standard, such as the Compute Express Link (CXL) interface standard or the Cache Coherent Interconnect for Accelerators (CCIX) interface standard.

In some embodiments, the serially-attached memory device may include memory media that is volatile, such as dynamic random-access memory, or non-volatile, such as flash memory. The serially-attached memory device may be a memory module that is receivable in a Peripheral Component Interconnect Express (PCIe) slot. Furthermore, a computer containing the host processor may include a plurality of such serially-attached memory devices.

In some embodiments, the memory device controller stores the received data at a particular memory address, and the error correction code calculated for the received data is stored in association with the particular memory address. Optionally, the received data and the calculated error correction code may be stored on two separate memory media chips on the same memory device as the memory device controller. Furthermore, the memory media may be error correction code memory, such as an error correction code dual in-line memory module including dynamic random-access memory.

In some embodiments, the memory device controller may temporarily store the received data in an error-protected buffer, then calculate error correction code for the received data prior to storing the received data and the calculated error correction code for the received data. Accordingly, the memory device controller may store the received data in the memory media coupled to the memory device controller at the same time that the memory device controller stores the error correction code for the received data in the memory media coupled to the memory device controller.

In some embodiments, the method may further comprise the memory device controller receiving a request from the host processor requesting to read the data stored on the memory media and transfer the read data to the host processor. After receiving the request or instruction, the memory device controller may read the stored data, calculate a current error-correction code for the read data, read the stored error-correction code, and determine whether the current error-correction code matches the stored error-correction code. If the current error-correction code matches the stored error-correction code, then it is presumed that none of the read data has experienced a memory error (bit flip) while being stored. Accordingly, the memory device controller may transfer the read data to the host processor over the error-protected serial link in response to determining that the current error-correction code matches the stored error-correction code. More specifically, the memory device controller may transfer the read data to the host processor without any error correction code data in response to determining that the current error-correction code matches the stored error-correction code.

However, if the memory device controller determines that the current error-correction code does not match the stored error-correction code, then a memory error may have occurred. So, the memory device controller may notify the host processor that the read data contains an error in response to determining that the current error-correction code does not match the stored error-correction code. To allow the host to deal with the error, the memory device controller transfers to the host processor the read data, the saved ECC data associated with the read data, the memory address of the read data, and ECC syndrome data describing the error determined to be contained in the read data in response to determining that the current error-correction code does not match the stored error-correction code.

In some embodiments, the host processor receives the read data, the saved ECC data associated with the read data, the memory address of the read data, and ECC syndrome data describing the error determined to be contained in the read data from the memory device controller over the error-protected link. The host processor may then calculate error-correction code syndrome data for the read data and the ECC data using an error-correction code algorithm that is the same as used by the memory device controller to calculate the saved error-correction code. Accordingly, the host processor may then determine whether the error-correction code syndrome data calculated by the host processor for the read data and ECC data matches the error-correction code syndrome data received from the memory device controller.

In some embodiments, if the host processor determines that the error-correction code syndrome data calculated by the host processor for the read data matches the error-correction code syndrome data received from the memory device controller, then the host processor may use the error-correction code syndrome data (either from the host processor calculation or from the memory device controller) to form corrected data and process the corrected data as being responsive to the request for data from the memory device. In a preferred option, the host processor may also transfer the corrected data to the memory device controller for storing over the read data that contained the error.

In some embodiments, if the host processor determines that the error-correction code syndrome data calculated by the host processor for the read data does not match the error-correction code syndrome data received from the memory device controller, then the host processor may attempt a higher-level error correction technique, such as an error correction technique based on interleaved data from multiple memory devices. In addition, the host processor may attempt a higher-level error correction technique in response to the host processor determining that the error-correction code syndrome data calculated by the host processor for the read data matches the error-correction code syndrome data received from the memory device controller and determining that the identified error is not correctable using the error-correction code syndrome data. A higher-level error correction technique that involves the use of data from multiple interleaved memory devices can only be performed by the host processor, since the memory device controller on any particular memory device only has access to the data stored on its own memory media.

A non-limiting example of an error correction code is a Hamming code, which is a family of linear error-correcting codes. Hamming codes have a minimum distance of 3, which means that the decoder can detect and correct a single error, but it cannot distinguish a double bit error of some codeword from a single bit error of a different codeword. The Hamming distance between two strings of equal length (i.e., the correct code and the erroneous code) is the number of positions at which the corresponding symbols are different. For example, the code 0100 and the code 1001 have a distance of 3. Thus, some double-bit errors will be incorrectly decoded as if they were single bit errors and therefore corrupt the data, unless further correction is attempted. To remedy this shortcoming, Hamming codes can be extended by an extra parity bit. This way, it is possible to increase the minimum distance of the Hamming code to 4, which allows the decoder to distinguish between single bit errors and two-bit errors. Thus, the decoder can detect and correct a single bit error and at the same time detect (but not correct) a double bit error. If the decoder does not attempt to correct errors, it can reliably detect triple bit errors. If the decoder does correct errors, some triple errors may be mistaken for single errors and "corrected" to the wrong value. Error correction is therefore a trade-off between certainty (the ability to reliably detect triple bit errors) and resiliency (the ability to keep functioning in the face of single bit errors). This extended Hamming code is popular in computer memory systems, where it is known as single error correction, double error detection (SECDED). Particularly popular is the (72,64) code, a truncated (127,120) Hamming code plus an additional parity bit, which has the same space overhead as a (9,8) parity code.

Some embodiments provide a serially-attached memory device comprising a printed circuit board, a predetermined number of memory chips mounted on the printed circuit board, a memory device controller mounted on the printed board and coupled to the memory chips, and an interface for connecting the memory device controller to a host processor over an error protected link. The memory device controller is configured to perform the operations of receiving data over the error-protected serial link from the host processor, storing the received data in the memory chips, calculating error correction code for the received data, and storing the error correction code in the memory chips.

In some embodiments of the serially-attached memory device, the memory device controller is configured to perform the further operations of receiving a request from the host processor requesting the memory device controller to read the data stored on the memory media and transfer the read data to the host processor. The memory device controller may then perform the further operations of reading the stored data and calculating a current error-correction code for the read data, reading the stored error-correction code and determining whether the current error-correction code matches the stored error-correction code, and transferring the read data to the host processor over the error-protected serial link in response to determining that the current error-correction code matches the stored error-correction code. Specifically, the read data may be transferred to the host processor without transferring any error-correction code associated with the read data.

In some embodiments of the serially-attached memory device, the memory device controller may be configured to perform the further operations of notifying the host processor that the read data contains an error in response to determining that the current error-correction code does not match the stored error-correction code, and transferring to the host processor the read data, the saved error-correction code associated with the read data, a memory address of the read data, and ECC syndrome data describing the error determined to be contained in the read data in response to determining that the current error-correction code does not match the stored error-correction code.

It should be recognized that embodiments of the serially-attached memory device may be configured to perform the operations according to various actions of the method that are attributable to the serially-attached memory device. Conversely, any of the operations that the serially-attached memory device is configured to perform may be included in one or more embodiment of the method. Still further, embodiments may include computer program products including program instructions that are executable by a processor to cause the processor to perform various operations implementing or initiating any one or more aspect of the methods described herein.

Some embodiments combine a host processor, a serially-attached memory device, and an error-protected serial link connecting the host processor to the memory device. The memory device includes a memory device controller that receives data from the host processor over the error-protected serial link and uses an error correction code algorithm to generate and manage an error correction code (ECC) for memory media on the memory device. This error correction code enables the memory device controller to perform error detection for certain errors that may arise in the memory device media. While the error correction code generated by the memory device controller does not protect against errors arising in the transmission of the data from the host processor to the memory device, the error-protected serial link provides its own error correction that protects the data until it has been successfully transferred across the serial link in either direction. Accordingly, embodiments that combine the error-protected serial link with a memory device that generates its own error correction code may provide end-to-end error protection all the way from the host processor to the memory device media and back to the host processor.

In some embodiments, the memory device controller may detect errors arising in the memory device media and flag the detected error to the host processor rather than attempt to correct the error in the data internally prior to transmission to the host processor. A technical benefit of merely flagging the detected error to the host processor is that the host processor may be capable of performing higher-level error correction techniques that are not able to be performed by an individual memory device, such as interleaving data to provide codeword spreading coverage across multiple memory devices.

Both the host processor and the memory device controller should use the same lower-level error correction code (ECC) algorithm so that they are able to calculate comparable error correction code for the data associated with a particular memory address. Furthermore, using the same error correction code algorithm facilitates the host processor's ability to perform higher-level error correction that is coordinated between multiple devices.

Some embodiments provide the technical benefit that interface bandwidth over a serial link to a serially-attached memory device may be conserved during typical run-time with few errors because the host does not have to transfer additional ECC parity information to the memory device. It is believed that some embodiments may allow for a 6-10% reduction in interface bandwidth to and from the serially-attached memory relative to existing methods that require transfer of the error-correction code from the host to the serial-attached memory device. In addition, the memory device controller does not need to pass ECC data to the host unless the memory device controller has detected an error in the data being read from the memory media. Furthermore, if the memory device controller detects an error, the memory device controller reports the error to the host for correction. The host may have a greater likelihood of correcting the error since the host may support a higher-level ECC, such as an ECC calculated from the data in interleaved memory devices and/or since the host may have greater visibility into the error rates and any error patterns that may require further actions. For example, some error patterns may indicate that a particular memory media is going bad (i.e., failing), such that any data stored in that memory media should be moved and that memory media should not be used further.

During normal run-time, embodiments of the memory device controller manage the ECC without having to send all the data to the host processor to be checked for errors. Only in those instances when the memory device controller detects an error will the memory device controller send all the needed information to the host processor to allow the host processor to double-check the information, to log the error and to take any further action to correct the error. For example, the host processor may correct the error using the ECC syndrome or the host processor may attempt a high-level ECC correction scheme, such as checking ECC across two or more memory devices. In addition, the host processor could take action to protect against further data corruption by moving data out of the affected memory device media and avoiding further use of the affected memory device media.

FIG. 1 is a diagram of a computing system 10 that includes a host processor 20 coupled to a serially-attached memory device 30 over an error-protected link 50. The serially-attached memory device 30 may take the form of a printed circuit board having an edge connector insertable into a CXL/PCIe slot 52. The serially-attached memory device 30 includes a memory device controller 32 that is in communication with the edge connector and CXL/PCIe slot 52 and is also coupled for communication with memory media 34, shown here as DRAM media chips.

Non-limiting examples of the error-protected link 50 may be implemented according to the Compute Express Link (CXL) interface standard or the Cache Coherent Interconnect for Accelerators (CCIX) interface standard. Compute Express Link (CXL) is an open standard interconnection for high-speed central processing unit (CPU)-to-device and CPU-to-memory, which is designed to accelerate next-generation data center performance. CXL is built on the PCI Express (PCIe) physical and electrical interface with protocols in three key areas: input/output (I/O), memory, and cache coherence. Cache coherent interconnect for accelerators (CCIX) is an interface for attaching accelerators to servers in a cache-coherent manner.

Optionally, the computing system 10 may further include a memory controller 60 coupled to the host processor or CPU 20. The memory controller 60 may implement a different error-correction code methodology, wherein the memory controller 60 includes an ECC encoder/decoder. Furthermore, the memory controller 60 is coupled to a dedicated data interconnect 64 to each of the memory modules 68 for data storage on multiple DRAM chips and is coupled to a dedicated ECC interconnect 66 to each of the memory modules 68 for ECC data storage on another DRAM chip ("ECC chip"). The computing system 10 is also shown with various other components that may support operation of the system but are not specifically involved in the described embodiments.

Figure 2:
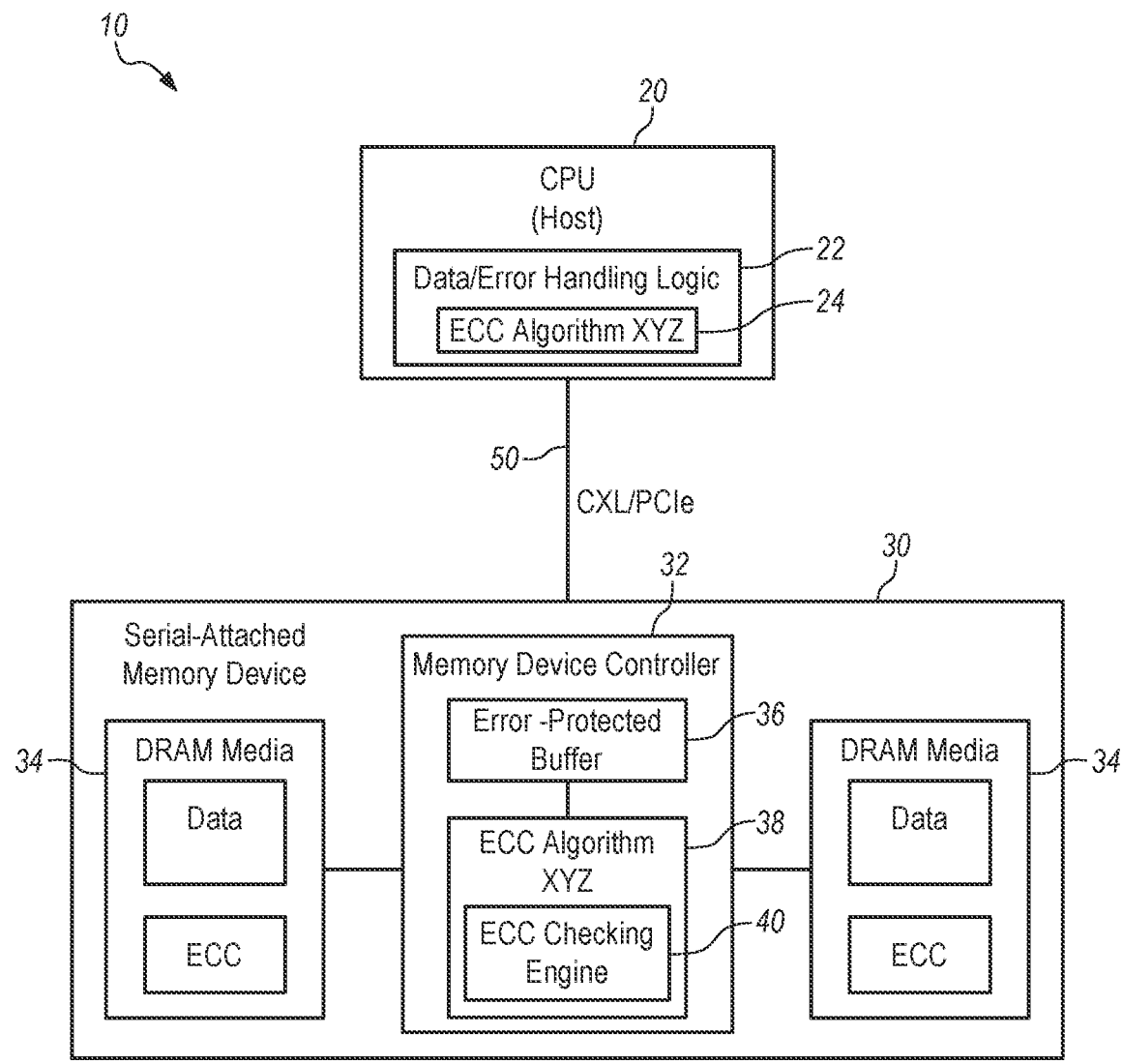
FIG. 2 is a diagram of the host processor and the serially-attached memory device coupled by the error-protected link.

FIG. 2 is a diagram of the computing system 10 highlighting only the host processor 20 and one serially-attached memory device 30 coupled by an error-protected link 50. The host processor 20 may executed data and error handling logic 22 for the purpose of writing data to the memory device 30, reading data from the memory device 30, and handling any errors flagged by the memory device 30. In order to handle errors, the host processor 20 may executed an ECC algorithm ("XYZ") 24 to calculate or generate ECC syndrome data for certain read data and ECC data.

The serially-attached memory device 30 includes a memory device controller 32 that is in communication with the host processor 20 over the error protected link 50 and is also in communication with memory media 34 (memory chips) secured to the same printed circuit board as the memory device controller 32. In accordance with some embodiments, the memory device controller 32 includes, or is connected to, an error-protected buffer 36 for temporarily storing data received from the host processor 20. The memory device controller 32 is configured to execute an ECC algorithm 38, which is preferably the same ECC algorithm as the ECC algorithm ("XYZ") 24 executed by the host processor 20. The ECC algorithm 38 is responsible for calculating error-correction code (ECC) for data that has been received from the host processor 20 for writing to the memory media 34 and for data that is being read from the memory media 34 before transmission to the host processor 20. An ECC checking engine 40 is also executed by the memory device controller 32 in order to determine whether data read from the memory media has experienced an error and to generate ECC syndrome data that may identify the type and location of the detected error.

The memory media 34 is illustrated as two separate memory chips, but a different number of chips may be included. The memory media 34 may include portions of a memory chip or a subset of the memory chips for data storage (i.e., storage of data received from the host processor 20) and portions of a memory chip or a subset of the memory chips for ECC data storage (i.e., storage of ECC data generated by the memory device controller 32 using the ECC algorithm 38). No architectural limitation of the memory media is intended by the illustration in FIG. 2.

FIGS. 3A-D are flowcharts of four related methods. The flowcharts are presented as separate methods, but references are included to illustrate connections between the operations of the flowcharts. Specifically, the methods collectively describe the interactions of the host processor and the memory device controller, but each of the four methods focus on a subset of actions performed primarily by one or the other of the host processor and the memory device controller.

FIG. 3A is a flowchart of a method 70 performed by the serially-attached memory device 30 responding to a write request 54 received from the host processor 20 over the error-protected link 50. In operation 72, the memory device controller stores data received from the host processor in an error-protected buffer. In operation 74, the memory device controller calculates error-correction code (ECC) for the received data. In operation, 76, the memory device controller stores the data in memory media of the memory device. Then, in operation 78, the memory device controller stores the calculated ECC in memory media of the memory device.

Figures 3C, 3D:
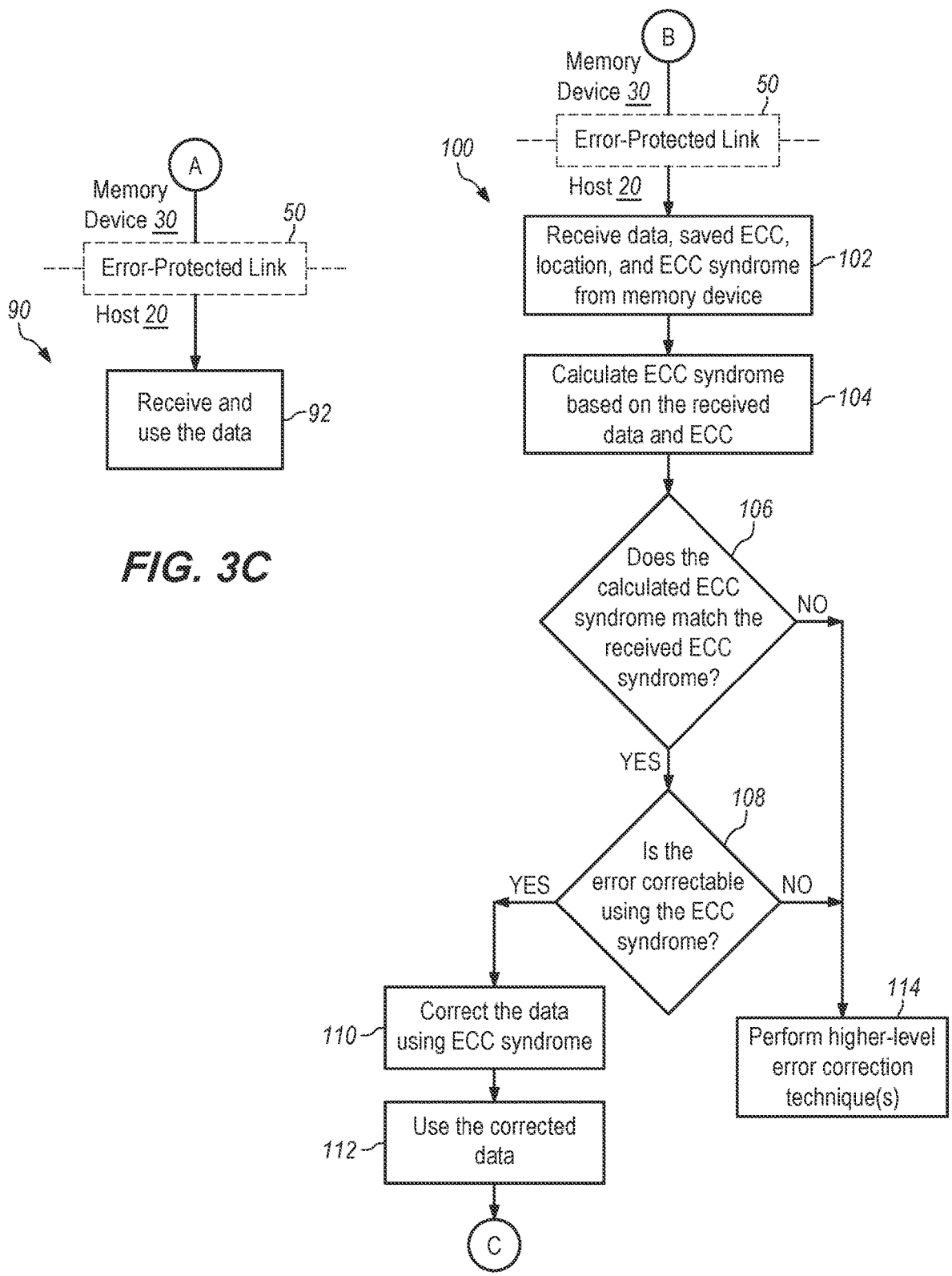
FIG. 3C is a flowchart for a method of the host processor receiving and using data received from the serially-attached memory device over the error-protected link.
FIG. 3D is a flowchart for a method of the host processor performing an error correction process in response to receiving data from the serially-attached memory device indicating that an error has been detected.

FIG. 3B is a flowchart for a method 80 of the serially-attached memory device 30 responding to a read request 56 received from the host processor 20 over the error-protected link 50. In operation 82, the memory device controller reads stored data from the memory media at a particular memory address included in the read request 56. In operation 84, the memory device controller calculates current ECC for the read data using the same ECC algorithm as in operation 74. In operation 85, the memory device controller determines whether or not the current ECC matches the ECC calculated in operation 74 and stored in memory media in operation 78. Operation 85 may further include the generation of ECC syndrome data, which may identify the type and/or location of an error, if any is detected (i.e., there current ECC does not match the stored ECC). If the current and saved ECC data match (see "YES" branch from operation 85) then, in operation 86, the memory device controller transfers the requested data to the host processor in satisfaction of the read request. Note that in the method 90 of FIG. 3C, the host processor 20 receives and uses the data received from the serially-attached memory device 30 over the error-protected link 50 as set out in operation 92. However, if the current and saved ECC data do not match (see "NO" branch from operation 85 indicating detection of an error) then, in operation 88, the memory device controller transfers the requested data to the host processor, but also transfers the saved ECC, the location or memory address of the read data containing the error, and the ECC syndrome generated by the memory device controller. The operations then continue on to the method 100 in FIG. 3D.

FIG. 3D is a flowchart for a method 100 for the host processor 20 performing an error correction process in response to receiving data from the serially-attached memory device 30 over the error-protected link 50 indicating that an error has been detected. In operation 102, the host processor 20 receives the requested data, the saved ECC, the location or memory address of the read data containing the error, and the ECC syndrome from the memory device controller 32. Optionally, the method may include a separate operation of the memory device controller 32 flagging the error to the host processor, but such need not be a separate operation so long as the host is made aware of the error in a timely manner to handle the error. In operation 104, the host processor 20 calculates ECC syndrome data based on the (read) data and the ECC that are both received from the memory device 30. In operation 106, the host processor 20 determines whether the calculated ECC system (calculated by the host processor) matches (is the same as) the ECC syndrome data received from the memory device 30. If a positive determination is made in operation 106 (i.e., the "YES" branch), then the host processor will perform a subsequent determination, in operation 108, whether the error is correctable using the ECC syndrome. If the host processor determines that the error is correctable in operation 108, then the host processor corrects the data using the ECC syndrome in operation 110, uses the corrected data in operation 112 in satisfaction of the read request from operation 56, and then may write the corrected data back to the memory device 30 as in operation 54 of FIG. 3A. However, if a negative determination is made in either operation 106 (see "NO" branch from operation 106) or in operation 108 (see "NO" branch from operation 108), then the method continues to operation 114 where the host processor performs, or attempts to perform, a higher-level error correction technique, such as using data from multiple interleaved memory devices. If such higher-level error correction technique is able to correct the data, then operation 114 might also be followed by operation 54 to write the correct data back to the memory media at the particular memory address.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-transitory computer readable medium and program instructions embodied therein, the program instructions being configured to be executable by a processor to cause the processor to perform operations comprising:

sending a request for data stored on memory media of a serially-attached memory device at a particular memory address, wherein the request is sent to the memory device over an error-protected serial link;

receiving, from the memory device over the error-protected link, the requested data, error correction code data stored on the memory media in associated with the requested data, the particular memory address of the requested data, and error correction code syndrome data describing an error that the memory device determined to be contained in the requested data;

calculating error-correction code syndrome data for the received data and error correction code data using an error-correction code algorithm;

determining whether the calculated error-correction code syndrome data matches the error-correction code syndrome data received from the memory device; and using, in response to determining that the calculated error-correction code syndrome data matches the error-correction code syndrome data received from the memory device, the error-correction code syndrome data to form corrected data and processing the corrected data as being responsive to the request for data.

2. The computer program product of claim 1, wherein the error-correction code algorithm used to calculate the error-correction code syndrome data for the received data and error correction code data is the same as an error-correction code algorithm used by the memory device to calculate the received error-correction code syndrome data.

3. The computer program product of claim 1, further comprising:
transferring the corrected data to the memory device for storing at the particular memory address.

4. The computer program product of claim 1, further comprising:
correcting the received data using an error correction technique based on interleaved data from multiple memory devices in response to determining that the calculated error-correction code syndrome data does not match the error-correction code syndrome data received from the memory device.

5. The computer program product of claim 1, further comprising:
correcting the received data using an error correction technique based on interleaved data from multiple memory devices in response to determining that the calculated error-correction code syndrome data matches the error-correction code syndrome data received from the memory device and that the identified error is not correctable using the error-correction code syndrome data.

6. The computer program product of claim 1, wherein the error-protected serial link implements a Compute Express Link (CXL) interface standard or a Cache Coherent Interconnect for Accelerators (CCIX) interface standard.

7. The computer-implemented method of claim 1, further comprising:
the host processor correcting the received data using an error correction technique based on interleaved data from multiple memory devices in response to determining that the calculated error-correction code syndrome data does not match the error-correction code syndrome data received from the memory device.

8. The computer-implemented method of claim 1, further comprising:
the host processor correcting the received data using an error correction technique based on interleaved data from multiple memory devices in response to determining that the calculated error-correction code syndrome data matches the error-correction code syndrome data received from the memory device and that the identified error is not correctable using the error-correction code syndrome data.

9. A computer-implemented method, comprising:
a memory device controller receiving data over an error-protected serial link from a host processor, wherein the memory device controller is included in a serial-attached memory device along with memory media coupled to the memory device controller;
the memory device controller storing the received data in the memory media coupled to the memory device controller at a particular memory address;
the memory device controller calculating error correction code for the received data; and
the memory device controller storing the error correction code in the memory media coupled to the memory device controller in association with the particular memory address;
the memory device controller receiving a request from the host processor requesting to read the data stored on the memory media and transfer the read data to the host processor;
the memory device controller reading the stored data and calculating a current error-correction code for the read data;
the memory device controller reading the stored error-correction code and determining whether the current error-correction code matches the stored error-correction code;
the memory device controller transferring the read data to the host processor over the error-protected serial link in response to determining that the current error-correction code matches the stored error-correction code;
the memory device controller notifying the host processor that the requested data contains an error in response to determining that the current error-correction code does not match the stored error-correction code;
the memory device controller transferring to the host processor the requested data, the stored error-correction code associated with the requested data, the memory address of the read data, and error-correction code syndrome data describing the error determined to be contained in the read data in response to determining that the current error-correction code does not match the stored error-correction code;
the host processor receiving the read data, the stored error-correction code associated with the read data, the memory address of the read data, and error-correction code syndrome data describing the error determined to be contained in the read data from the memory device controller over the error-protected link;
the host processor calculating error-correction code syndrome data for the read data and ECC data using an error-correction code algorithm that is the same as used by the memory device controller to calculate the stored error-correction code;
the host processor determining whether the error-correction code syndrome data calculated by the host processor for the read data matches the error-correction code syndrome data received from the memory device controller; and
the host processor, in response to determining that the error-correction code syndrome data calculated by the host processor for the read data matches the error-correction code syndrome data received from the memory device controller, using the error-correction code syndrome data to form corrected data and processing the corrected data as being responsive to the request for data from the memory device.

10. The computer-implemented method of claim 9, further comprising:
the host processor transferring the corrected data to the memory device controller for storing at the particular memory address.

11. The computer-implemented method of claim 9, further comprising:
the memory device controller temporarily storing the received data in an error-protected buffer, wherein the memory device controller calculates the error correction code for the received data prior to storing the received data and the calculated error correction code for the received data.

12. A computer-implemented method, comprising:
a host processor sending a request for data stored on memory media of a serially-attached memory device at a particular memory address, wherein the request is sent to the memory device over an error-protected serial link;

the host processor receiving, from the memory device over the error-protected link, the requested data, error correction code data stored on the memory media in associated with the requested data, the particular memory address of the requested data, and error correction code syndrome data describing an error that the memory device determined to be contained in the requested data;

the host processor calculating error-correction code syndrome data for the received data and error correction code data using an error-correction code algorithm;

the host processor determining whether the calculated error-correction code syndrome data matches the error-correction code syndrome data received from the memory device; and the host processor using, in response to determining that the calculated error-correction code syndrome data matches the error-correction code syndrome data received from the memory device, the error-correction code syndrome data to form corrected data and processing the corrected data as being responsive to the request for data.

13. The computer-implemented method of claim 12, wherein the error-correction code algorithm used to calculate the error-correction code syndrome data for the received data and error correction code data is the same as an error-correction code algorithm used by the memory device to calculate the received error-correction code syndrome data.

14. The computer-implemented method of claim 12, wherein the error-protected serial link implements a Compute Express Link (CXL) interface standard or a Cache Coherent Interconnect for Accelerators (CCIX) interface standard.

15. The computer-implemented method of claim 12, further comprising:

the host processor transferring the corrected data to the memory device for storing at the particular memory address.

* * * * *